United States Patent [19]

Azizi

[11] Patent Number: 4,966,191
[45] Date of Patent: Oct. 30, 1990

[54] MIXING VALVE ASSEMBLY FOR SINGLE-HANDLE FAUCETS

[76] Inventor: Sohiel Azizi, 14 Wildbrook St., Irvine, Calif. 92714

[21] Appl. No.: 368,661

[22] Filed: Jun. 20, 1989

[51] Int. Cl.⁵ .......................................... F16K 11/078
[52] U.S. Cl. ............................. 137/625.17; 137/625.4
[58] Field of Search ............. 137/625.17, 636.4, 625.4

[56] References Cited

U.S. PATENT DOCUMENTS

| | | | |
|---|---|---|---|
| Re. 26,838 | 3/1970 | Pecis | 137/636.4 X |
| 2,556,780 | 6/1951 | Shryock | 137/625.17 |
| 3,168,112 | 2/1965 | Klingler | 137/625.17 |
| 3,202,181 | 8/1965 | West | 137/625.17 |
| 3,893,481 | 7/1975 | Watts | 137/625.17 |
| 4,040,446 | 8/1977 | Watts | 137/625.17 |
| 4,183,376 | 1/1980 | Moen | 137/625.17 |

FOREIGN PATENT DOCUMENTS

| | | |
|---|---|---|
| 2904555 | 8/1979 | Fed. Rep. of Germany ........................ 137/625.17 |
| 3301181 | 7/1984 | Fed. Rep. of Germany ... 137/625.4 |

Primary Examiner—John Rivell
Attorney, Agent, or Firm—Richard L. Gausewitz

[57] ABSTRACT

A single-handle faucet for mixing liquid and water and controlling the flow rate therethrough. A valve element having a generally cylindrical shut-off seal and a generally cylindrical ported seal mounted axially adjacent each other on a stem portion of the valve element. A single handle is provided to shift the valve element axially of the bore to control flow volume and to effect shut-off, or rotationally to control water temperature. The relationships are such that both peripheral squeeze and water-pressure forces are employed to provide sealing actions at the shut-off seal and ported seal. The actuating means is a handle that extends through a slot in the valve body, and indicators are provided adjacent the handle to indicate temperature range.

14 Claims, 3 Drawing Sheets

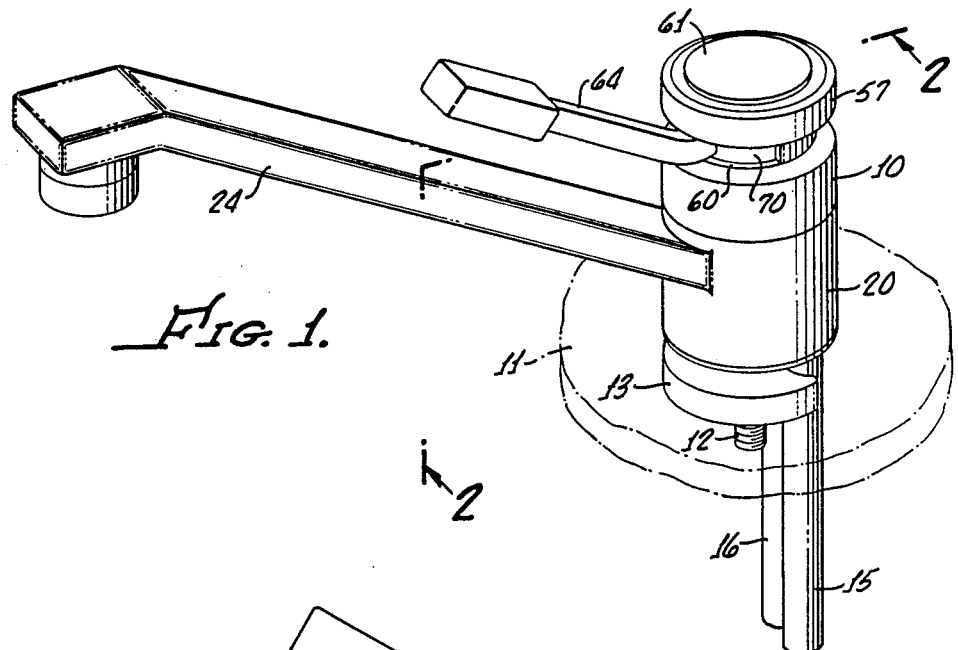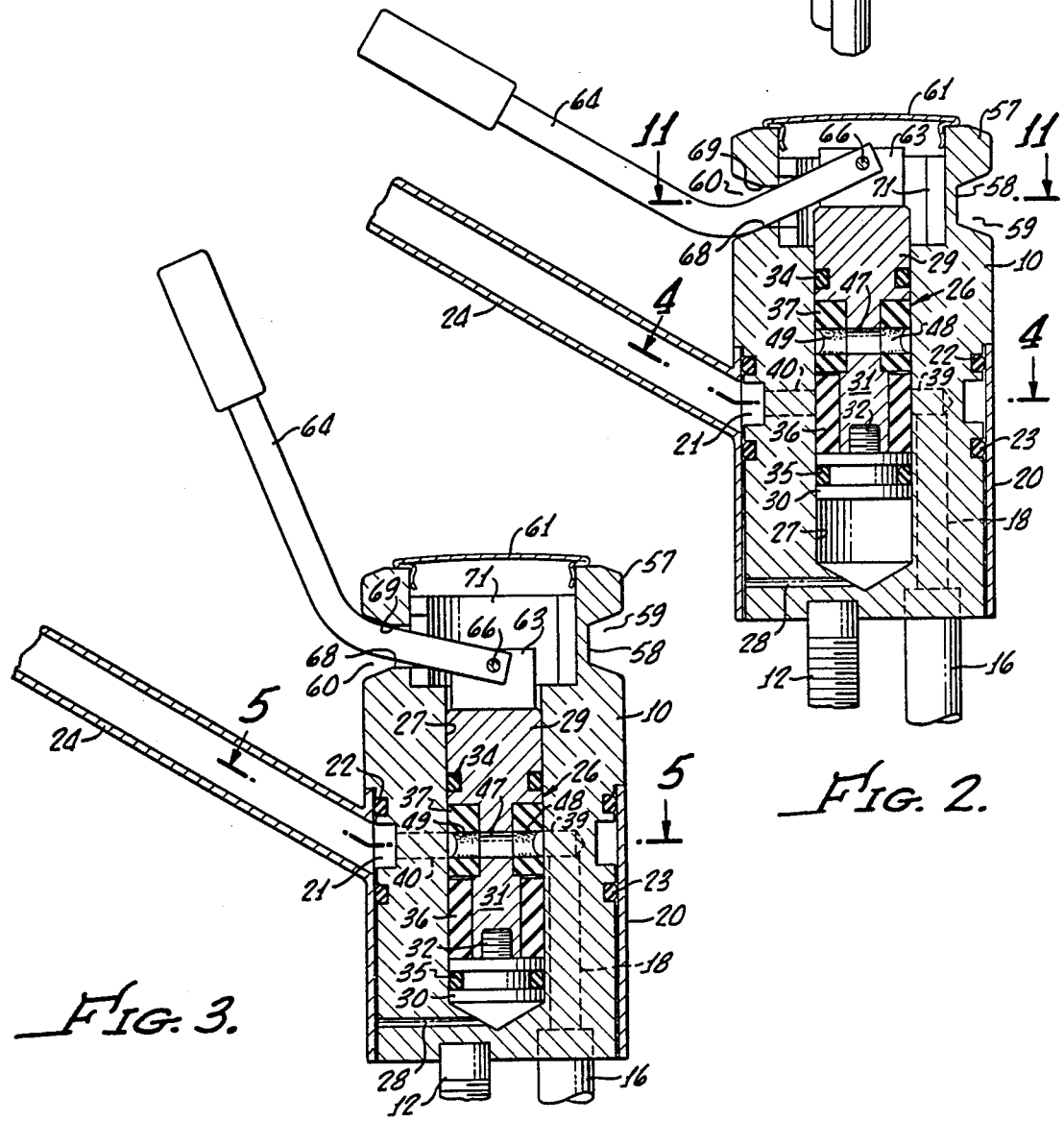

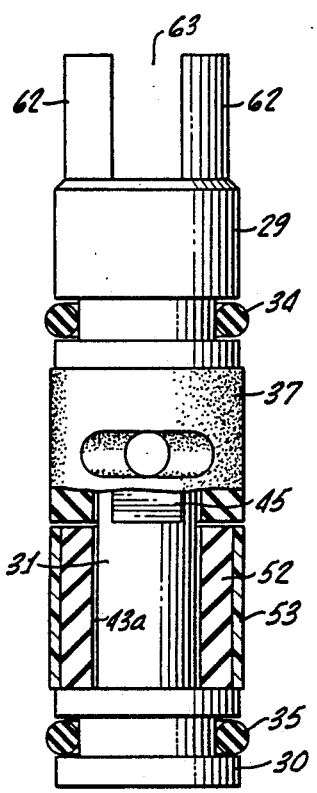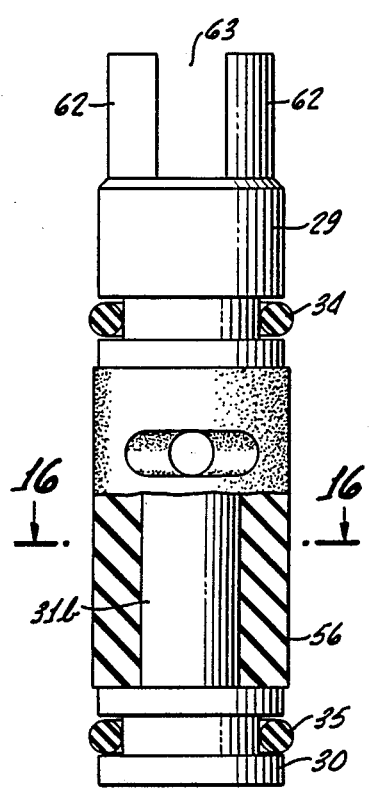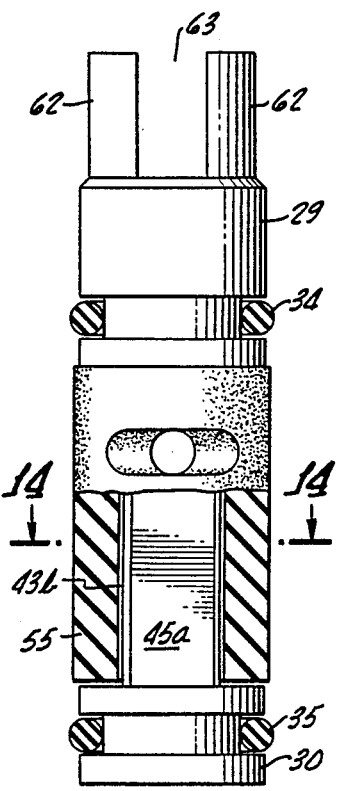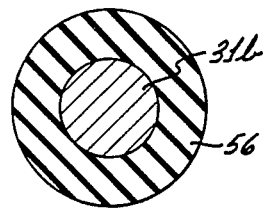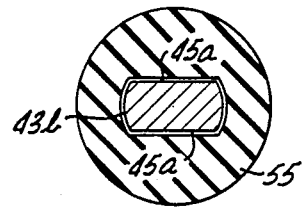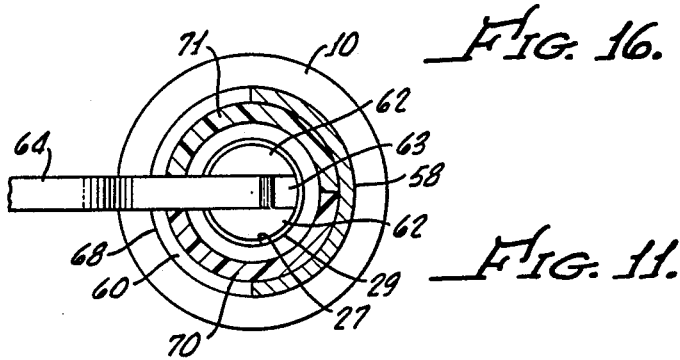

MIXING VALVE ASSEMBLY FOR SINGLE-HANDLE FAUCETS

Background of the Invention

Water faucets that accomplish both mixing and flow control by means of a single handle have become almost universally employed in kitchen sinks, in the United States, and are widely used in other applications. The single-handle mixing-valve art is advanced, but there is room for major improvements in key areas. Basically, a major problem not yet solved is how to achieve high quality with inexpensive components that don't require tight tolerances.

It is well known that it is possible to achieve high quality if tight tolerances and a substantial number of manufacturing steps are employed. The hard thing to do is to achieve high quality without tight tolerances and with relatively few components and manufacturing steps. Furthermore, it is important to achieve compactness and universality, so that the valve element may be employed not only in kitchen sinks but in many types of valves wherein both mixing and flow control are needed.

Relative to another aspect of the present invention, it is important that the exterior portions of faucets and the like be not only beautiful but functional, and that they provide a practical and decorative means of indicating whether the water temperature coming out of the faucet will be hot, cold, or medium. No faucet known to applicant has accomplished these results in a practical and satisfactory manner.

Summary of the Invention

The present invention provides a mixing and flow-control valve element and system that achieves very high quality and reliability of performance, in a simple manner and at a low cost. Stated more definitely, the present control valve element can be made with few and simple processing steps, simple tooling, optimum material usage, and relatively wide tolerances so as to cut manufacturing costs while still resulting in a very high-quality and reliable valve. The valve is usable in numerous applications including kitchen sinks, bathroom sinks, showers and various other applications. It is adaptable to numerous types of faucet configurations.

The present invention incorporates a valve element which is compact in size, and which may be installed in a small space, and which has few moving parts, thus producing important cost and performance benefits.

The present invention makes use of standard 0-rings that lie in planes perpendicular to the axis of the valve element. Very importantly, the invention also incorporates cylindrical seal elements that are readily extruded, molded or otherwise manufactured at low cost.

The invention provides, in its preferred form, a cylindrical seal element which is a lightly squeezed in a cylindrical bore in the valve body, yet it is so constructed as to allow free rotation of the valve stem disposed coaxially of such bore. There is conjointly provided an initial sealing action and a water-pressure sealing action. The relationships are such that there is achieved a lowered force necessary to rotate the valve stem in order to determine the temperature of the out-flowing water (or other liquid).

In accordance with another aspect of the invention, two cylindrical seals are provided in adjacent coaxial relationship on a valve stem, one seal being for shut-off purposes and the other being for water temperature-control and flow rate-control purposes. Such other seal is a ported seal. The one seal is a free fit relative to the valve stem while the other is not, thereby achieving relatively low resistance to rotation while also achieving effective isolation between hot and cold ports.

The invention preferably employs two inlet ports and two outlet ports that, desirably, are opposite each other, and that are selectively adjacent a shut-off seal or a temperature/flow control seal, depending upon the longitudinal position of the valve stem. The material, thickness and hardness of the shut-off seal are coordinated to the port diameter, port seat, and to the expected water pressures in such manner as to provide effective sealing in the absence of ballooning or substantial wear.

In other embodiments, the shut-off seal and ported seal are provided in the same sealing element instead of two separate elements.

Referring to another aspect of the invention, the valve stem with seals thereon is actuated longitudinally and rotationally by a lever that is inserted through a slot in the valve body, such slot performing multiple functions. The slot permits introduction of the control lever or handle and also introduction of the screwdriver or other tool that secures the inner end of such handle to the valve stem. Furthermore, the walls of the slot provide fulcrum regions for the lever. In addition, the slot operates as a window for temperature-indicating elements associated with the valve stem. The ends of the slot act as stops for the handle or lever.

Brief Description of the Drawings

FIG. 1 is an isometric view of one of various external configurations of the present valve apparatus and system;

FIG. 2 is a vertical sectional view taken on line 2—2 of FIG. 1;

FIG. 3 is a view corresponding to FIG. 2 but showing the positions of the parts after the valve stem has been actuated to the position opposite that shown in FIG. 2;

FIG. 11 is a horizontal section taken on line 11—11 of FIG. 2;

FIG. 12 is a view corresponding to FIG. 8 but showing a second embodiment of the invention, in which a thin friction-reducing sleeve is mounted around the shut-off seal in order to reduce the resistance to longitudinal shifting of the stem;

FIG. 13 is a view corresponding to FIG. 8 but showing an embodiment of the invention in which only a single seal is employed, such seal being a loose fit on the stem which is so shaped as to prevent rotation of the seal relative to the stem;

FIG. 14 is a horizontal sectional view on line 14—14 of FIG. 13;

FIG. 15 is a view of an additional embodiment, in which the seal is bonded to a cylindrical stem; and FIG. 16 is a horizontal section on line 16—16 of FIG. 15.

Figure 4:
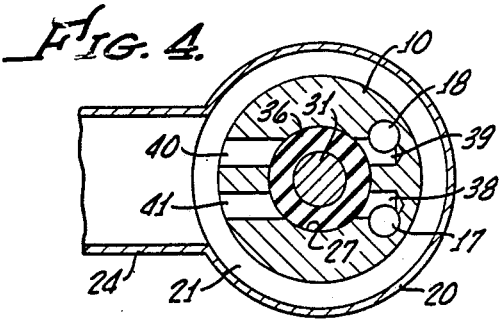
FIG. 4 is a horizontal section on line 4—4 of FIG. 2, showing the relationships that are present when the valve is in off condition.

Description of the Preferred Embodiment and Other Embodiments

By way of example only, and not limitation, the present invention will be described and illustrated as incorporated in a faucet for a kitchen sink. It is to be understood, however, that the invention may also be incorporated in faucets for bathroom and other sinks, in shower valves, as well as in mixing and flow-control valves for various other applications.

Referring to FIGS. 1–3, a valve body 10 having a cylindrical shape is mounted on a sink top indicated at 11 in FIG. 1. In the illustrated form, the body is mounted by means of a bolt 12 that extends downwardly through sink top 11 and has tightened thereon a nut (not shown). A washer 13 is disposed between the nut and the sink top, and is shaped to permit passage therethrough of hot and cold water pipes 15,16 that extend downwardly through the sink top from the lower end of body 10.

Pipes 15,16 are preferably relatively adjacent each other, being in line with, and communicating sealingly with, hot and cold water passages 17,18 (respectively) that extend vertically through the valve body.

A sleeve 20 in mounted coaxially and rotatably on the lower portion of valve body 10, the upper end of such sleeve being disposed somewhat above an annular groove 21 that is formed in the valve body generally at the same elevation as that of the upper ends of passages 17,18. Hot and cold water, and mixtures thereof, are delivered to groove 21 from passages 17,18 by means of the ports and valve element described in detail below, there being 0-rings 22,23 mounted above and below groove 21 to prevent leakage. A spout 24 extends outwardly from sleeve 20 in order to receive water from groove 21 and delivered to a desired point of use.

Under following subheadings, there will be described the preferred (and other) embodiments of the ports and the valve element, following which there will be described the preferred mechanism for shifting the valve element both longitudinally and rotationally. It is to be understood, however, that any suitable mechanism for shifting the valve element longitudinally and rotationally may be employed.

Description of the Preferred Embodiment of Ports and Valve Element

The valve element, numbered 26, is preferably of small and compact construction in the illustrated faucet. For example, the valve element may be about ⅜ inch diameter and 2 and ¼ inches long (the length including the actuating portions at the top).

The valve element 26 fits movably in a cylindrical bore formed coaxially of valve body 10 except at the lower end of such body. Such bore has a cylindrical wall 27. A vent passage 28 connects to the bottom end of the bore to prevent air-pressure effects when the valve element 26 moves axially.

Figure 7:
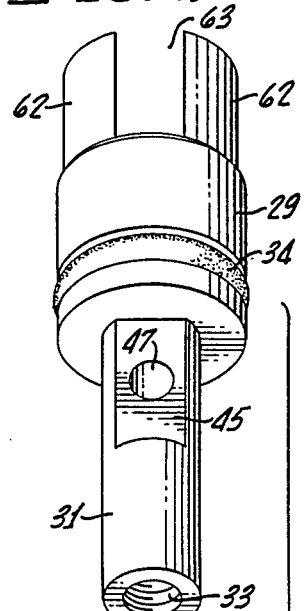
FIG. 7 is an exploded isometric view of the valve element shown in FIGS. 2-6 and 8-9.

As best shown in the exploded view of FIG. 7, the valve element 26 has cylindrical upper and lower end cylinders 29 and 30 that are a sliding fit relative to cylindrical bore wall 27. Such cylinders 29,30 are connected coaxially to opposite ends of a relatively small diameter stem 31 that spaces the cylinders 29,30 a substantial distance from each other. The distance is sufficient that the valve element 26 may move axially of the bore wall 27 between a shut-off position and positions at which there is full or partial flow of water through the valve.

The connection between upper end cylinder 29 and stem 31 is preferably integral. That between the lower end cylinder and stem 31 is preferably threaded, there being a threaded element 32 formed integrally on the lower end cylinder 30 and adapted to be threaded into a threaded bore 33 at the lower stem end. Cylinder 30 is adapted to be threadedly connected to the stem 31 after the below-described seal elements have been mounted on the stem.

Each end cylinder 29,30 is provided with an annular groove in which is mounted an 0-ring, the 0-rings being numbered 34,35, respectively. Such 0-rings provide seals that prevent leakage of water from the bore. The 0-rings defined between them a pressurized compartment. The water pressure acting upwardly on end cylinder 29 is substantially equal to that acting downwardly on end cylinder 30, so that these pressures neutralize each other and prevent axial shifting of valve element 26 due to water pressure. Stated otherwise, the balanced pressures acting on the end cylinders cooperate with the friction present relative to the valve element to prevent undesired shifting of the valve element.

Mounted on stem 31 in axially adjacent relationship, between upper end cylinder 29 and lower end cylinder 30, are two cylindrical seals 36,37 preferably formed of elastomeric material. Preferably, the elastomeric material is an ethylene propylene monomer, or a similar compound having substantially the same properties. Seal 36 is the shut-off seal and is adapted to prevent leakage of water through the valve when it is in the shut-off condition. There is thus prevented any water leakage through or around stem 31 when the valve element 26 is in the shut-off position of FIG. 2. Seal 37 is the ported seal that is adapted to permit flow of water through stem 31, but without any significant undesired mixing of hot and cold water, when the valve element 26 is in the flow position of FIG. 3. It is to be understood that FIG. 3 shows the valve in its full-flow position, but that any desired amount of water flow can be achieved by moving element 26 axially so as to effect any desired degree of full or partial registry of ports in seal 37 with associated ports in valve body 10.

Reference will first be made to the shut-off seal 36, which is best depicted in FIGS. 2, 4, and 7–9. Because seal 36 is preferably below seal 37, seal 36 is at the elevation of the upper ends of hot and cold water passages 17,18 when valve element 27 is in the upper position shown in FIG. 2. Four ports 38–41 are provided in valve body 10 in communicating relationship to the axial bore in such body, through the wall 27 of that bore. The ports 38–41 preferably all lie in the same radial plane perpendicular to the axis of the valve element, such radial plane being preferably at substantially the same elevation as the upper ends of the hot and cold water passages 17,18.

Figure 9:
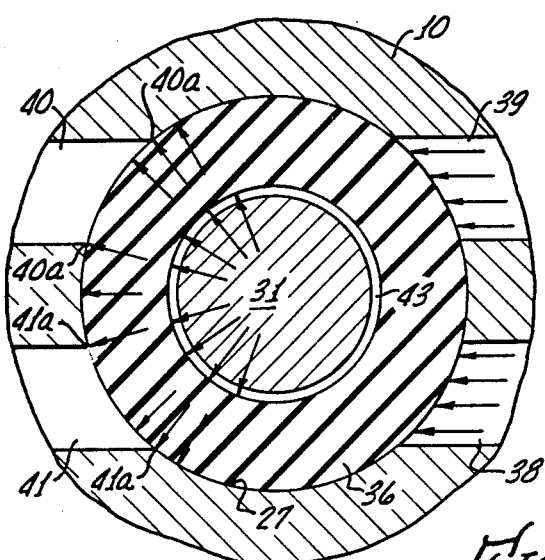
FIG. 9 is an enlarged horizontal section of the central region of the showing of FIG. 4, and showing in exaggerated form the gap between the shut-off seal and the stem.

Referring particularly to FIGS. 4 and 9, there are two inlet ports 38,39 that communicate with passages 17,18, respectively, and are therefore at line pressure. The remaining two ports, numbers 40,41, are outlet ports that communicate with annular groove 21 and thus with spout 24. Preferably, outlet port 40 is diametrically opposite inlet port 38 and receives hot water therefrom. Correspondingly, outlet port 41 is preferably diametrically opposite inlet port 39 and receives cold water therefrom.

Ports 38,39 are spaced predetermined relative small distances from each other, the distances being correlated to the size and shape of port means in the ported seal 37 described below. Correspondingly, the ports 40 and 41 are spaced predetermined small distances from each other that are correlated to port means in the ported seal 37. Water passages 17,18 may be drilled simultaneously and parallel to each other. The four ports 38–41 ma be drilled simultaneously by two drills that are parallel to each other. Thus, the various ports 38–41 are cylindrical in cross-sectional shape. Port 40 is preferably directly in line with port 39 and therefore can be drilled by one drill, while port 41 is preferably directly in line with port 38 and thus can be drilled by a second drill parallel to such one drill.

Referring now to enlarged FIG. 9 only, it is emphasized that at the periphery of each outlet port 40,41, where the wall of such port meets cylindrical wall 27, there is what is here termed a "port seat" 40a (for port 40) and 41a (for port 41). These seats or edges 40a,41a are caused to be smooth and free of burrs. Such port seats are of critical importance in achieving full shut-off of water when the valve is in closed condition.

Proceeding to a description of the preferred embodiment of the shut-off seal 36, such seal has concentric cylindrical external and internal surfaces the diameters of which are respectively correlated to the diameters of bore wall 27 and the cylindrical wall of stem 31. Furthermore, the wall thickness of seal 36 is correlated to the diameters of ports 40,41, to the range of pressures, and to the material of which seal 36 is made, in such manner that seal 36 will not undesirably "balloon" into the ports 40,41 with normal water pressure drop.

Stated generally, full water shut-off is achieved at the port seats 40a,41a (FIG. 9) by two sealing actions. One such sealing action is achieved by the elastomeric seal 36 even prior to application of water pressure. The other sealing action is effected by water pressure acting in the regions of such port seats. Stated in another manner, the first sealing action is an initial contact pressure caused by the resilience of the elastomer, while the second sealing action is the water pressure build-up against the seal at the outlet ports 40,41, which forces the elastomer against the port seats 40a,41a and creates leak-tight sealing.

The initial port closure (sealing) is effected by elastomer surface contact pressure over the seats 40a,41a. Such contact pressure is achieved by what may be termed "peripheral squeeze" of the seal 36. The shut-off seal 36 is slightly squeezed as it is installed into the bore defined by wall 27. The squeezing action is at the outside cylindrical surface of the seal 36. The amount of said squeeze is caused to be very low, and is only necessary when very low water-pressure conditions are present. When water pressure is present at the inlet ports of the valve, the seal 36 seeks the path of least resistance, which in this case is the outlet port seats 40a,41a. The sealing action is augmented by increased water pressure.

In accordance with the preferred embodiment of the invention, shut-off seal 36 is caused to be floating in relation to the cylindrical wall of stem 31. Thus, stem 31 is caused to be free to rotate within seal 36. The seal 36 is permitted to adjust itself so as to compensate for a small amount of offset or misalignment. The floating relationship is represented by the annulus 43 (shown in enlarged FIG. 9), such annulus being formed between the concentric cylindrical surfaces of stem 31 and of seal 36. The annulus is shown in exaggerated form in FIG. 9, and is not shown at all in FIGS. 2–4 because of the small size of such figures. It is pointed out that all of FIGS. 1–10 depict the identical preferred embodiment of the invention.

Actuation of the element 26, both longitudinally and rotationally, is made easy by eliminating causes of high friction, by factors which are achieved by the preferred embodiment. There are two frictional forces generated at the inner face between the seals and the bore wall 27. The first frictional force is caused by contact pressure of seal 36 with the bore wall. This contact pressure varies with seal diameter, seal material, and seal hardness. Such one contact pressure is caused to be low, by providing (selecting) only a small amount of squeezing action. For example, the outer diameter of seal 36 when in free condition is caused to be in the range of 0.001 inch and 0.006 inch larger than the diameter of bore wall 27. Only the small amount of seal squeeze is required, to assure against leakage at very low water-pressure conditions, because the primary seal is water-pressure generated at the port seats as described above and below.

Referring again to the water pressure-generated seals at the outlet ports 40,41, particularly at the port seats 40a,41a, although the water pressure may be relatively high the actual pressure at the outlet ports 40,41 is low because of the relatively small diameters of such ports and their seats. The water pressure acts against the inner surface of seal 36, since there is water present in the annulus 43. The regions of such inner surface that are opposite ports 40,41 operate to slightly bulge regions of seal 36 into the ports 40,41. This slight bulging is normally caused to be so small that it is not shown in FIG. 9 or elsewhere. The slight bulging creates a stress concentration at each port seat 40a,41a, which effectively seals against leakage through ports 40,41 despite presence of water within seal 36 and even between seal 36 and bore wall 27.

Bore 27 is caused to have a very smooth surface, preferably being plated and being properly lubricated prior to installation of the seals. Seal material and lubrication are such as to create optimum sliding relationships between the seal 36 and the bore wall 27, especially at port seats 40a,41a so as not to damage the seal material when the valve element 26 is shifted between shut-off and flow positions. Silicone grease, and/or compounds having self-contained lubricates, are employed.

Referring again to the shut-off sealing action caused by water pressure, it is to be understood that when the water enters the valve it occupies the entire space defined by bore wall 27. Thus, it is present in annulus 43 as well as elsewhere. It follows that there is outwardly-directed pressure caused by the water in annulus 43 at all regions, including the regions surrounding outlet ports 40,41. The amount of this sealing force varies with water pressure.

Let it be assumed that the valve is in the shut-off position of FIG. 2. Let it also be assumed that no water has as yet been delivered to either of water pipes 15 and 16 from the line. Let it also be assumed that the line pressure is at some moment of time delivered through one or both of the water pipes to the inlet ports 38,39. At that moment, the above-indicated peripheral squeeze is already present and is sufficiently great to permit the water pressure within the chamber defined by bore wall 27 (and by the O-rings) to build up and allow seal 36 to seek the path of least resistance, and create the described water-pressure sealing action. As stated above, such sealing action is only present around the peripheries of outlet ports 40,41, namely at port seats 40a,41a. There is a large pressure drop at such ports because the pressure on the downstream side of such ports is generated only by the spout of the valve.

Figure 5:
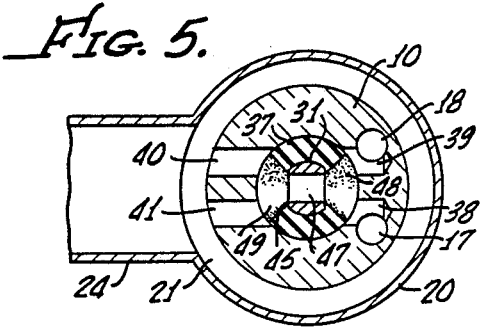
FIG. 5 is a horizontal sectional view on line 5—5 of FIG. 3, showing the conditions that are present when the valve is in full flow and medium-temperature condition.
Figure 6:
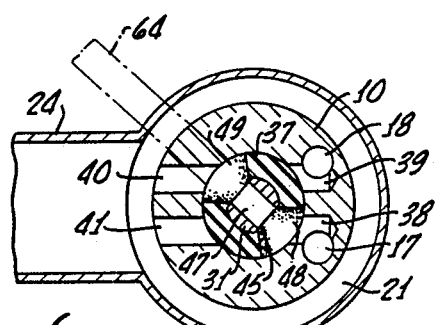
FIG. 6 corresponds to FIG. 5 but illustrates the positions of the parts when the valve is in its position permitting flow of hot water only, not mixed with cold.

The ported seal 37, specifically described below, has many characteristics of the shut-off seal 36 relative to lubrication, material, etc. Such shut-off seal 37 is mounted in nonrotatable relationship on the upper portion of stem 31. The nonrotatable relationship in the preferred embodiment is created by providing flats 45 on that portion of stem 31 on which the seal 37 is mounted. Furthermore, the seal 37 does not have a cylindrical internal wall but instead a partially-cylindrical internal wall 46 as shown at the lower end of seal 37 in FIG. 7. A cylindrical passage 47 is formed through the axis of stem 31 at flats 45, and communicates at its opposite ends to enter regions of seal ports 48,49 that are formed in the ported seal 37. Preferably, passage 47 and seal ports 48,49 are coaxial as shown in FIGS. 5 and 6. The ports 48,49 fan out in directions away from stem 31, at sufficient angles that the outer regions of ports 48,49 can be in substantial communication with both outlet ports 40,41 at the same time, when the ported seal 37 is in the position of FIG. 5, for example. FIG. 5 shows the seal ports 48,49 in a position that effects mixing of hot and cold water in substantially equal portions, but it is to be understood that rotation of the element 26 in either direction changes the mixing relationships.

Figure 8:
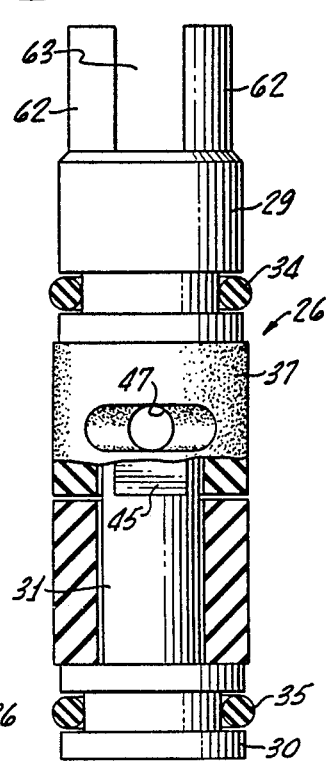
FIG. 8 is an enlarged view, partially in side elevation and partially in longitudinal section, showing the valve element of FIGS. 2-6 and 9.

Preferably, the walls of seal ports 48,49 are not frustoconical but instead oblong as shown, for example, in FIG. 7 and FIG. 8. The upper and lower walls of the seal ports preferably do not extend substantially above or below the upper and lower walls of outlet ports 40,41.

To ensure that seal 37 will rotate with stem 31, the fit between stem 31 and its flats 45, relative to the internal wall 46 of the seal, is caused to be a sliding fit but one which would not deform the seal after assembly. The outer cylindrical surface of ported seal 47 is sized to be slightly squeezed by bore wall 27 as the ported seal 37 is inserted into the bore. Such slight squeezing is generally the same as that described above relative to the shut-off seal, but it is emphasized that there is (in the preferred embodiment) much less clearance of the ported seal relative to the stem than there is between the shut-off seal and the stem. With the described relationships, the seal 37 rotates with the stem 31, yet there are sealing actions preventing undesired flow of hot or cold water; thus, for example, there is no significant flow of cold water when the valve is in the position of FIG. 6.

As previously indicated, it is a feature of the present construction that the tolerances need not be tight. This is true not only relative to the dimension in radial directions, relative to the seals for example, but also in longitudinal directions. Thus, the seals 36,37 fit easily between end elements 29,30 on stem 31, no compression deformation in a longitudinal direction being desired. There can even be a longitudinal gap which is indicated at 50 in FIG. 8, such showing being exaggerated relative to the width of the gap.

When water is flowing through the sealing ports 48,49 and through passage 47 between inlet ports 17,18 and outlet ports 40,41 (or selected ones of such latter ports), the seal is effected by both elastomer surface contact pressure and by water pressure. The contact pressure results from the light peripheral squeeze present between the exterior cylindrical surface of seal 37 and the bore wall 27. The water pressure is present in the ports 46,47 and also between bore wall 27 and the external cylindrical surface of seal 37. There is thus sufficient seal contact pressure sealing action to prevent significant undesired flow of water between the hot and cold passages, it is not to be thought that the sealing action is as drip-tight as that described relative to shut-off seal 36.

Embodiment of FIG. 12

The structural components of the embodiment of FIG. 12 are identical to what was described above relative to the preferred embodiment, except that the shut-off seal 36 is replaced by shut-off seal elements 52 and 53. Elements 52,53 are concentric cylinders in surface contact with each other, and there is a gap 43a as described relative to gap 43 of the preferred embodiment.

The inner seal element 52 is an elastomer such as (preferably) the above-mentioned ethylene propylene monomer, while the outer seal element 53 is a relatively thin sleeve of a low-friction synthetic resin such as that trademarked "Teflon". The outer seal 53 is sufficiently thin and soft that it will distort somewhat, and achieve sealing, in response to fluid pressure forces.

The purpose of the outer sleeve 53 is to reduce friction somewhat during longitudinal shifting of the element 26.

All of the elastomers employed in the cylindrical seals described in the present specification preferably have Shore hardnesses (durometer) in the range 75 to 85 (A scale). On the other hand, the Teflon element 53 preferably has a Shore hardness (durometer) in the range 50 to 55 (D scale).

Instead of or in addition to replacing the shut-off seal 36 of the preferred with the seal elements 52,53 of the embodiment of FIG. 12, the ported seal 37 of the preferred embodiment may have a thin synthetic resin sleeve (such as one formed of Teflon) nonrotatably associated therewith and similarly ported. Alternatively, the entire ported seal may be formed of synthetic resin such as Teflon or another suitable low-friction synthetic resin.

Embodiment of FIGS. 13,14

The embodiment of FIGS. 13,14 is structurally identical to that of the preferred embodiment (FIGS. 1–11, inclusive), except that the two sealing elements 36,37 are replaced by a single sealing element 55. Furthermore, the entire stem 31a is formed with flats 45a. The single seal 55, which fits loosely between end elements 29,30, is interiorly shaped correspondingly to the flatted stem 31a. Preferably, the fit between the flatted stem and the single seal is a loose sliding fit, as represented in exaggerated form by the gap 43b shown in FIGS. 13,14.

The single seal 55 is caused to have such an outer diameter that it is slightly squeezed as it is installed in the bore.

The ports in the upper portion of seal 55 are identical to those described relative to the preferred embodiment.

A disadvantage of the embodiment of FIGS. 13,14, relative to the preferred embodiment is that the amount of force required to rotate the valve element is increased, in that the entire seal rotates with the stem instead of only the ported portion rotating with the stem.

Embodiment of FIGS. 15,16

The embodiment of FIGS. 15,16 is identical to that of the preferred embodiment (FIGS. 1–11, inclusive), with the major exception that the seal 56 is not "floating" as were the shut-off seals of the previous embodiments, being instead transfer molded and cured/bonded over the stem. The stem 31b is entirely cylindrical.

Seal 56 has such a diameter as to have a very light squeeze fit in the bore in the valve body.

Description of the Actuating Means for the Element 26, and of
the Means for Indicating Water Temperature Range Referring to FIGS. 1–3 and 10–11, there is formed at the upper end of valve body 10 a top ring 57. Such ring is connected coaxially to the remainder of the valve body by a generally semicylindrical thin-walled connector portion 58, such portion also being coaxial with the remainder of the valve body. Stated in another manner, there is formed between top ring 57 and the remainder of valve body 10 an annular recess about half of which is a groove 59 and about half of which is a slot or window 60. A cap 61 is spring-fit coaxially at the upper end of the valve body to close the chamber that is defined within top ring 57 and portions of valve body 10 therebeneath.

The upper end of element 26 has upwardly extending parallel connector elements or ears 62 that are separated by a gap 63. A lever or handle 64, which is also a crank, and is preferably bent as shown, is extended inwardly through slot or window 60 into the gap 63. A shoulder screw 66 is threaded horizontally through threaded bores in connector portions or ears 62, and extends through a bore in the inner end of handle 64, to provide pivotal connection between the handle and the valve element 26. Preferably, the handle is bent upwardly, as is shown, after passing through the window 60.

To lift the valve element 26 to the shut-off position shown in FIG. 2, handle 64 is moved downwardly. A portion of such handle then engages a bottom fulcrum 68 (FIG. 2) which provides a mechanical advantage causing the element to shift upwardly. The amount of mechanical advantage may be adjusted by changing the length of handle 64.

Conversely, to shift element 26 downwardly to the flow position shown in FIG. 3, or to another desired flow position, handle 64 is pivoted upwardly. A top fulcrum 69 is then engaged by the handle to again provide a mechanical advantage.

The handle 64 operates as a crank to rotate the element 26 about is longitudinal axis, between limits or stops formed by the ends of connector portion 58 of the valve body, to thus determine the temperature of the outflowing water.

It is one of the advantages of the present invention that attractive visual means are provided to indicate generally what that temperature will be. As shown in FIGS. 11 and 14, there are two semicylindrical (arcuate) temperature-indicating elements 70 and 71 that are preferably formed of a tough synthetic resin material. Each of these elements is half of a circle. Element 70 is red while element 71 is blue.

Figure 10:
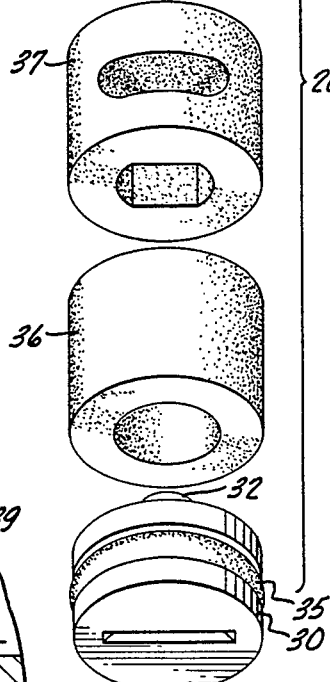
FIG. 10 is an isometric view of temperature-indicating cylinder portions as associated with the valve handle and valve body slot.

The elements 70,71 fit in the upper end of valve body 10, being partially encompassed by the connector portion 58. The elements are sufficiently large in vertical dimension as to extend above and below slot or window 60. Furthermore, adjacent ends of the element are notched to receive that portion of lever or handle 64 passing between them (FIG. 10).

With the described construction, sideways movement of handle 64 operates to push one of the elements 70,71 in a circular path in the upper end of the valve body, and when such element moves in a circular path it pushes the other element in a continuation of the same circular path. Thus, both elements 70,71 move circularly when lever or handle 64 moves circularly.

The positioning of the elements 70,71 is such that the red element 70 will be exposed to view at window 60 when the valve is in the hot position shown in FIG. 6. Conversely, the blue element will be exposed to view when the element is in the cold position that is the opposite of the hot position of FIG. 6. When the handle is in intermediate position, both red and blue will be viewable through the window. Thus, the user is given a general indication of the water temperature to be expected when the valve is operated, and does not perform the common action of putting the valve in the hot position when cold water is desired, and visa versa.

The verb "balloon", as used herein, denotes excessive deformation of the shut-off seal into the outlet ports, so as to cause seal damage (or prevent seal movement) when the valve handle is manipulated to shift the valve element longitudinally. The verb "balloon" does not denote small flexing of the shut-off seal into the outlet ports.

The foregoing detailed description is to be clearly understood as given by way of illustration and example only, the spirit and scope of this invention being limited solely by the appended claims.

What is claimed is:
1. A combination liquid-mixing and flow-control valve of the single-actuator type, which comprises:
 (a) a valve body having a cylindrical bore therein,
 (b) a valve element mounted coaxially in said bore for longitudinal and rotational movement therein in response to shifting of an actuating means for said valve element,
  said valve element having spaced apart end portions mounted sealingly in said bore,
  said end portions being connected by a stem,
 (c) means to separately conduct two classes of liquids through said valve body to first and second inlet ports though the wall of said bore,
 (d) outlet port means through said wall of said bore,
  said outlet port means being spaced from said inlet ports,
  said outlet port means communicating with a single outlet element from said valve body,

(e) shut-off seal means and ported seal means mounted around said stem,
said seal means being generally cylindrical,
at least said ported seal means being adapted to rotate with said stem as said valve element is rotationally moved by said actuating means,
said shut-off seal means being adapted to sealingly block said outlet port means when said valve element is in a predetermined longitudinal position in said bore,
the material and the thickness of said shut-off seal means, and the size of said outlet port means, being so related to the expected liquid pressures in the valve that said shut-off seal means will not balloon into said outlet port means, and
(f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

2. The invention as claimed in claim 1, in which said outlet port means comprises two outlet ports located at different positions circumferentially of said bore.

3. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element,
said valve element having spaced apart end portions mounted sealingly in said bore,
said end portions being connected by a stem,
(c) means to separately conduct two classes of liquids through said valve body to first and second inlet ports though the wall of said bore,
(d) outlet port means through said wall of said bore,
said outlet port means being spaced from said inlet ports,
said outlet port means communicating with a single outlet element from said valve body,
(e) shut-off seal means and ported seal means mounted around said stem,
said shut-off seal means being generally cylindrical,
at least said ported seal means being adapted to rotate with said stem as said valve element is rotationally moved by said actuating means,
at least said shut-off seal means being mounted loosely on said stem, to provide a floating seal relationship,
said shut-off seal means being adapted to sealingly block said outlet port means when said valve element is in a predetermined longitudinal position in said bore, and
(f) port means through said ported seal means to selectively conduct liquid from said first inlet port to said outlet port means, and from said second inlet port to said outlet port means, and from both inlet ports to said outlet ports means, depending on the rotated position of said valve element, when said valve element is in a longitudinal position in said bore different from said predetermined longitudinal position therein.

4. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element,
said valve element having spaced apart end portions mounted sealingly in said bore,
said end portions being connected by a stem,
(c) means to separately conduct two classes of liquids through said valve body to first and second inlet ports though the wall of said bore,
said outlet and inlet ports having only two axes whereby two drills may form such ports,
(d) outlet port means through said wall of said bore,
said outlet port means being spaced from said inlet ports,
said outlet port means communicating with a single outlet element from said valve body,
said outlet port means comprising two outlet ports located at different positions circumferentially of said bore,
one of said outlet ports being direct alignment with a first inlet port, the other of said outlet ports being in direct alignment with a second inlet port, all of said outlet and inlet ports being the same diameter,
(e) shut-off seal means and ported seal means mounted around said stem,
said seal means being generally cylindrical, at least said ported seal means being adapted to rotate with said stem as said valve element is rotationally moved by said actuating means,
said shut-off seal means being adapted to sealingly block said outlet port means when said valve element is in a predetermined longitudinal position in said bore, and
(f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

5. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element,
said valve element having spaced apart end portions mounted sealingly in said bore,
said end portions being connected by a stem,
(c) means to separately conduct two classes of liquids through said valve body to first and second inlet ports though the wall of said bore,
(d) outlet port means through said wall of said bore,
said outlet port means being spaced from said inlet ports,
said outlet port means communicating with a single outlet element from said valve body,
(e) shut-off seal means and ported seal means mounted around said stem,
said seal means being generally cylindrical, at least said ported seal means being adapted to rotate with said stem as said valve element is rotationally moved by said actuating means, said shut-off seal means being adapted to sealingly block said outlet port means when said valve element is in a predetermined longitudinal position in said bore, at least said shut-off seal means having a light squeeze fit in said bore and being mounted on said stem in floating relationship and not bonded to said stem, whereby both peripheral squeeze and liquid-pressure drop across said shut-off seal means at said outlet ports effect full shut-off preventing of flow of liquid through the valve, and (f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

6. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element, said valve element having spaced apart end portions mounted sealingly in said bore, said end portions being connected by a stem,
(c) means to separately conduct two classes of liquids through said valve body to first and second inlet ports though the wall of said bore,
(d) outlet port means through said wall of said bore, said outlet port means being spaced from said inlet ports, said outlet ports means communicating with a single outlet element from said valve body,
(e) shut-off seal means and ported seal means mounted around said stem, said seal means being generally cylindrical, at least said ported seal means being adapted to rotate with said stem as said valve element is rotationally moved by said actuating means, said shut-off seal means and ported seal means being two separate sealing elements axially adjacent each other, said ported seal means being mounted on said stem for rotation therewith, said shut-off seal means being loosely mounted on said stem in floating relationship and being a light squeeze fit in said bore, whereby both peripheral squeeze and fluid-pressure drop provide sealing actions preventing leakage of liquid through the valve when said shut-off valve means is adjacent said ports and port means, said shut-off seal means being adapted to sealingly block said outlet port means when said valve element is in a predetermined longitudinal position in said bore, and (f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

7. The invention as claimed in claim 6, in which said stem has flats on opposite sides thereof at said ported seal means, the flatted portions of said stem having a bore therethrough communicating with said ports and port means.

8. The invention as claimed in claim 6, in which said shut-off seal means comprises an inner cylinder of elastomeric material and an outer cylinder of low-friction material, said outer cylinder being sufficiently thin that internal pressure forces will cause it be in shut-off relationship with said outlet ports.

9. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element, said valve element having spaced apart end portions mounted sealingly in said bore, said end portions being connected by a stem,
(c) means to separately conduct two classes of liquids through said valve body to first and second inlet ports though the wall of said bore,
(d) outlet port means through said wall of said bore, said outlet port means being spaced from said inlet ports, said outlet port means communicating with a single outlet element from said valve body,
(e) shut-off seal means and ported seal means mounted around said stem, said seal means being generally cylindrical, at least said ported seal means being adapted to rotate with said stem as said valve element is rotationally moved by said actuating means, said shut-off seal means and ported seal means comprising a single elastomeric cylindrical sealing element, said ported seal means being mounted on said stem for rotation therewith, said shut-off seal means being loosely mounted on said stem in floating relationship and being a light squeeze fit in said bore, whereby both peripheral squeeze and fluid-pressure drop provide sealing actions preventing leakage of liquid through the valve when said shut-off valve means is adjacent said ports and port means, said shut-off seal means being adapted to sealingly block said outlet port means when said valve element is in a predetermined longitudinal position in said bore, and (f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

10. The invention as claimed in claim 9, in which said single element is nonrotatably mounted on said stem in a manner that is sufficiently tight that said cylinder will rotate with said stem but sufficiently loose that liquid may penetrate the space between said stem and the interior of said element.

11. A combination liquid-mixing and flow-control valve of the single-actuator type, which comprises:
(a) a valve body having a cylindrical bore therein,
(b) a valve element mounted coaxially in said bore for longitudinal and rotational movement therein in response to shifting of an actuating means for said valve element,
said valve element having spaced apart end portions mounted sealingly in said bore,
said end portions being connected by a stem,
(c) means to separately conduct two classes of liquids through said valve body to first and second inlet ports though the wall of said bore,
(d) outlet port means through said wall of said bore, said outlet port means being spaced from said inlet ports,
said outlet port means communicating with a single outlet element from said valve body,
(e) shut-off seal means and ported seal means mounted around said stem,
said seal means being generally cylindrical,
at least said ported seal means being adapted to rotate with said stem as said valve element is rotationally moved by said actuating means,
said shut-off seal means and ported seal means comprising a single element bonded to said stem,
said single element having a light squeeze fit in said bore,
said shut-off seal means being adapted to sealingly block said outlet port means when said valve element is in a predetermined longitudinal position in said bore, and
(f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein.

12. A combination liquid-mixing and flow-control valve of the single-actuator type, which comprises:
(a) a valve body having a cylindrical bore therein,
said cylindrical bore having a wall, said wall of said cylindrical bore in said valve body, at least at regions adjacent said outlet port means, being smooth and burr-free,
(b) a valve element mounted coaxially in said bore for longitudinal and rotational movement therein in response to shifting of an actuating means for said valve element,
said valve element having spaced apart end portions mounted sealingly in said bore,
said end portions being connected by a stem,
(c) means to separately conduct two classes of liquids through said valve body to first and second inlet ports though the wall of said bore,
(d) outlet port means through said wall of said bore, said outlet port means being spaced from said inlet ports,
said outlet port means communicating with a single outlet element from said valve body,
there being port seats encompassing said outlet port means at said wall of said cylindrical bore,
(e) shut-off seal means and ported seal means mounted around said stem,
said seal means being generally cylindrical,
at least said ported seal means being adapted to rotate with said stem as said valve element is rotationally moved by said actuating means,
said shut-off seal means being mounted sufficiently loosely on said stem that water may penetrate between said stem and the interior surface of said shut-off seal means,
said shut-off seal means being adapted to sealingly block said outlet port means when said valve element is in a predetermined longitudinal position in said bore, and
(f) port means through said ported seal means to selectively conduct liquid from said first inlet port to said outlet port means, and from said second inlet port to said outlet port means, and from both inlet ports to said outlet port means, depending on the rotated position of said valve element, when said valve element is in a longitudinal position in said bore different from said predetermined longitudinal position therein,
whereby to prevent damage to said shut-off seal means and to achieve effective seating of said shut-off seal means on said port seats encompassing said outlet port means at said wall of said cylindrical bore.

13. The invention as claimed in claim 12, in which seal means are provided at said spaced apart end portions of said valve element, said seal means cooperating with said wall of said cylindrical bore to define a pressure chamber within said valve body.

14. The invention as claimed in claim 13, in which said outlet port means comprises two separate outlet ports, and in which the material and the thickness of said shut-off seal means, and the sizes of said outlet ports are so related to the expected liquid pressures in the valve that said shut-off seal means will not balloon into said outlet ports means although flexing of said shut-off seal means into said outlet ports is possible.

* * * * *

UNITED STATES PATENT AND TRADEMARK OFFICE
CERTIFICATE OF CORRECTION

PATENT NO. : 4,966,191
DATED : October 30, 1990
INVENTOR(S) : SOHIEL AZIZI

It is certified that error appears in the above-identified patent and that said Letters Patent is hereby corrected as shown below:

Claim 4 (column 12, line 24), after "being", add ---in---.

Claim 6 (column 13, line 41), delete "ports" and substitute therefor ---port---.

Claim 14 (column 16, line 56), delete "ports" and substitute therefor ---port---.

Signed and Sealed this

Eighteenth Day of February, 1992

Attest:

HARRY F. MANBECK, JR.

*Attesting Officer*  *Commissioner of Patents and Trademarks*